US008606818B2

(12) United States Patent
Leung et al.

(10) Patent No.: US 8,606,818 B2
(45) Date of Patent: Dec. 10, 2013

(54) OPTIMIZING THE STORAGE OF ONE-TO-MANY EXTERNAL REFERENCES TO CONTIGUOUS REGIONS OF HIERARCHICAL DATA STRUCTURES

(75) Inventors: Anita O. L. Leung, Markham (CA); John Mourra, Oakville (CA); C. Lorne Parsons, Richmond Hill (CA); Kevin Quan, Toronto (CA); Crystal J. Su, Toronto (CA); Grant D. Taylor, Richmond Hill (CA); Hiroshi Tsuji, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/839,005

(22) Filed: Jul. 19, 2010

(65) Prior Publication Data
US 2012/0016908 A1    Jan. 19, 2012

(51) Int. Cl.
*G06F 7/00*     (2006.01)
*G06F 17/30*    (2006.01)

(52) U.S. Cl.
USPC .......................................... 707/795; 707/796

(58) Field of Classification Search
USPC .................. 707/795, 792, 793, 803, 808, 812
See application file for complete search history.

(56) References Cited

U.S. PATENT DOCUMENTS

| | | | | |
|---|---|---|---|---|
| 6,418,445 | B1 * | 7/2002 | Moerbeek | 1/1 |
| 7,099,887 | B2 * | 8/2006 | Hoth et al. | 1/1 |
| 7,389,296 | B2 * | 6/2008 | Chari et al. | 1/1 |
| 2004/0103105 | A1 * | 5/2004 | Lindblad et al. | 707/100 |
| 2005/0240604 | A1 | 10/2005 | Corl, Jr. et al. | |
| 2007/0143331 | A1 * | 6/2007 | Holtz et al. | 707/102 |
| 2008/0215520 | A1 * | 9/2008 | Gu et al. | 706/48 |
| 2008/0222087 | A1 * | 9/2008 | Balmin et al. | 707/2 |
| 2009/0094074 | A1 | 4/2009 | Nikovski et al. | |

OTHER PUBLICATIONS

Spiegel, J., et al., "Graph-based synopses for relational selectivity estimation," Proc.of the 2006 ACM SIGMOD Int'l. Conf. on Management of Data, Jun. 27-29, 2006.

* cited by examiner

*Primary Examiner* — Kimberly Wilson
*Assistant Examiner* — Hexing Liu
(74) *Attorney, Agent, or Firm* — Patents on Demand P.A.; Brian K. Buchheit; Scott M. Garret (57) ABSTRACT

A volatile memory manager of a data handling system can be configured to convert the one-to-many external reference into an external reference that references the common ancestor node of the contiguous region. Specific pathing and/or termination conditions can be contained in a Relationship_Path parameter of the external reference. The hierarchical data structure can also be loaded into volatile memory by the volatile memory manager as data structure references. The volatile memory manager can be further configured to perform various functions utilizing the external and data structure references.

12 Claims, 6 Drawing Sheets

Example Hierarchical Data Structure   400

```xml
<?xml version="1.0" encoding="UTF-8" ?>
<schema xmlns= "http://www.w3.org/2001/XMLSchema" targetNamespace=
        "http://www.example.org/NewXMLSchema" xmlns:tns="http://www.example.org/
        NewXMLSchema" elementFormDefault="qualified" >
  <complexType name="aFemale" ></complexType>
  <complexType name="aMale" ></complexType>

<element name="aBoyChild" type="tns:aMale" ></element>
  <element name="aFemaleChild" type="tns:aFemale" ></element>
  <element name="aFather" >
        <complexType>
          <sequence>
              <element ref="tns:aFemaleChild" ></element>
          </sequence>
        </complexType>
   </element>
  <element name="anotherFather" >
        <complexType>
          <sequence>
              <element ref="tns:aBoyChild" ></element>
          </sequence>
        </complexType>
  </element>
  <element name="aGrandma" type="tns:grandparentType" ></element>
  <complexType name="grandparentType" >
        <sequence>
          <element ref="tns:aFather" ></element>
          <element ref="tns:anotherFather" ></element>
        </sequence>
  </complexType>
</schema>
```

Data Structure References 420

| 422 ID | 424 Parent | 426 Child | Relationship 428 ID | 430 Properties | Relationship Path 432 |
|---|---|---|---|---|---|
| 0001 | aGrandma | aFather | 0001 | Flattenable | |
| 0002 | aGrandma | anotherFather | 0002 | Flattenable | |
| 0003 | aFather | aFemaleChild | 0001 | Flattenable | |
| 0004 | anotherFather | aBoyChild | 0001 | Flattenable | |

(Row labels: 435, 436, 437, 438)

FIG. 4B

Example References 465

| |
|---|
| ER1 – aGreatGrandFather has relationships to : aGrandma, aFather, anotherFather, aFemaleChild, and aBoyChild) |
| ER2 – aGrandFather has relationships to: aFather, anotherFather, aFemaleChild, and aBoyChild |
| ER3 – anotherMother has relationships to: aBoyChild |
| ER4 – aGreatGrandFatherWhoDoesNotConsider ChildrenBloodRelatives has relationships to: aGrandFather, aFather, and anotherFather |

FIG. 4C

References 440

| 422 ID | 424 Parent | 426 Child | Relationship 428 ID | 430 Properties | Relationship_ Path 432 | |
|---|---|---|---|---|---|---|
| 1001 | aGreatGrandFather | aGrandma | 0001 | Deep Ref | | 442 |
| 1002 | aGrandFather | aFather | 0001 | Deep Ref | | 444 |
| 1003 | aGrandFather | anotherFather | 0001 | Deep Ref | | 446 |
| 1004 | anotherMother | aBoyChild | 0001 | Deep Ref | | 448 |
| 1005 | aGreatGrandFatherWho... | aGrandFather | 0001 | Deep Ref | aFather, anotherFather | 450 |

FIG. 4D

OPTIMIZING THE STORAGE OF ONE-TO-MANY EXTERNAL REFERENCES TO CONTIGUOUS REGIONS OF HIERARCHICAL DATA STRUCTURES

BACKGROUND

The present invention relates to the field of data storage and, more particularly, to optimizing the storage of one-to-many external references to contiguous regions of hierarchical data structures.

A long-standing concern of software performance has been memory usage. This is often especially problematic in software systems that operate using one-to-many references to hierarchical data structures. Conventional memory management approaches decompose the one-to-many reference into separate one-to-one relationships to the individual nodes of the data structure and load each relationship into volatile memory. As the quantity of nodes included in the one-to-many reference increases, more volatile memory is consumed and performance decreased.

Some approaches to this problem have focused on increasing the availability of volatile memory for use, such as paging. Some approaches utilize compression schemes in order to use less volatile memory. However, compression schemes consume additional resources (e.g., memory, processing power, time) in order to compress and decompress the data.

DETAILED DESCRIPTION

The present disclosure provides a solution for optimizing the storage of one-to-many external references to contiguous regions of hierarchical data structures in volatile memory. A volatile memory manager of a data handling system can be configured to convert the one-to-many external reference into an external reference that references the common ancestor node of the contiguous region. Specific pathing and/or termination conditions can be contained in a Relationship_Path parameter of the external reference. The hierarchical data structure can also be loaded into volatile memory by the volatile memory manager as data structure references. The volatile memory manager can be further configured to perform various functions utilizing the external and data structure references.

As used herein, a contiguous region refers to a logical relationship among nodes in the hierarchical data structure. For example, a contiguous region can refer to a set of contiguous relationships along a branch of the hierarchical data structure (such as child nodes of a common parent node). In one embodiment, the contiguous region can refer to a chain of nodes that are linked from one to the other (such as by flattenable references, for example). In one embodiment, one or more consistent limitations or conditions can be imposed on the contiguous region. For instance, the contiguous region can include a set of nodes having a specific characteristic (where nodes lacking this characteristic will be excluded from the region, which they would otherwise be within. The storage space optimized by the disclosure refers to a quantity of memory consumed to specify the contiguous region. This memory can be a volatile memory, such as random access memory (RAM) (although in another embodiment, the disclosure can be used to nonvolatile memory space as well—for instance a swap space of a non-volatile memory can utilize concepts disclosure herein). As shall be shown, the disclosure describes how to optimize storage of relationships (e.g., contiguous relationships of a hierarchical data structure). It further describes how to retrieve relationships stored in this manner.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
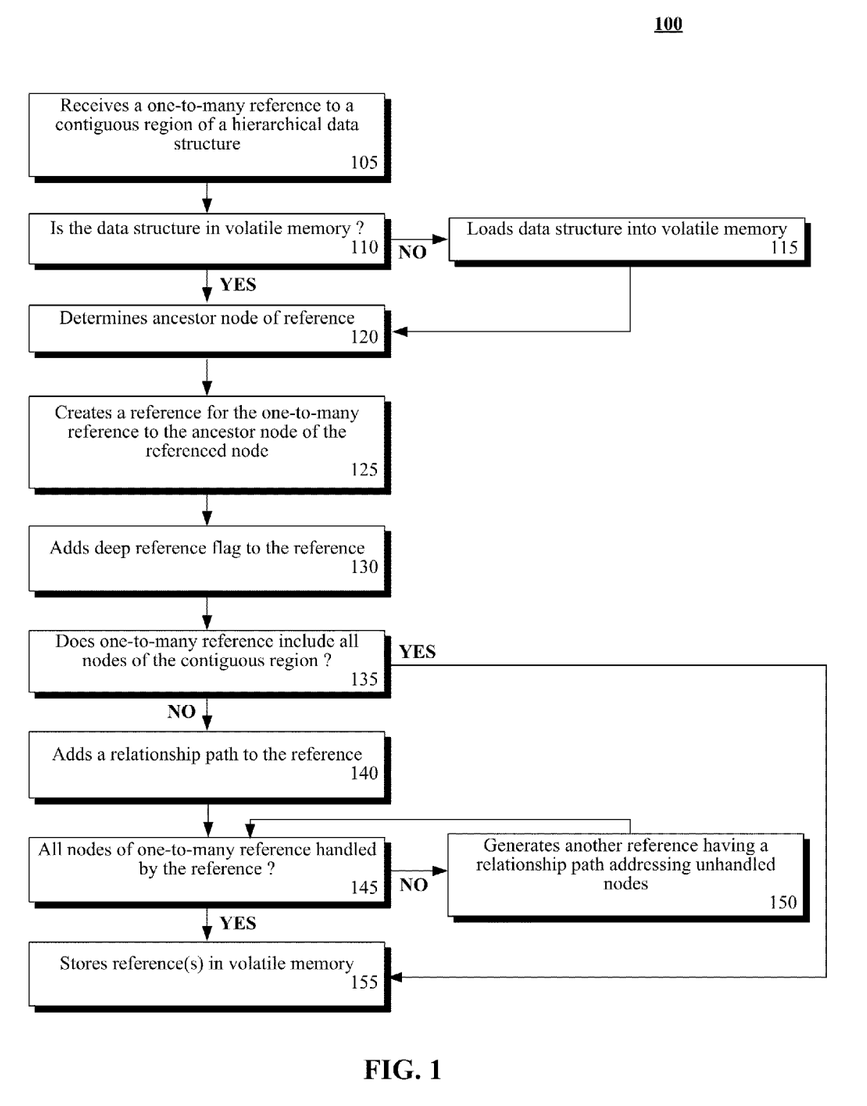
FIG. 1 is a flow chart of a method describing a technique for optimizing the storage of one-to-many external references to a contiguous region of a hierarchical data structure in accordance with embodiments of the inventive arrangements disclosed herein.

FIG. 1 is a flow chart of a method 100 describing a technique for optimizing the storage of one-to-many external references to a contiguous region of a hierarchical data structure in accordance with embodiments of the inventive arrangements disclosed herein. The steps of method 100 can be performed by an appropriately configured memory management component of a computing system, as will be discussed in later Figures.

As used herein, optimizing the storage of a one-to-many external reference can refer to the minimization of the quantity of references, and, therefore, storage space (i.e., volatile memory space) required to express a one-to-many external reference to the contiguous region of the hierarchical data structure.

As used herein, the term "hierarchical data structure", and herein referred to a "data structure", can refer to a structure of data having several levels, where the data can be arranged in a treelike structure. That is, it can refer to a logical data structure in which the relationships between records form a hierarchy or tree structure. Relationships among records can be one-to-many, since each data element is related only to one element above it. In one embodiment, the hierarchical data structure can refer to a data structure that meets the following conditions:

the data structure can be described as a number of subcomponents;
every component is related to another component through a parent-child relationship;
each parent-child relationship is 1:1, though a parent component can have multiple children;
each parent-child relationship is unique or can be uniquely identified; and
there is one component of the data structure that is the parent or ancestor of all other components (i.e., a root node).

When the above conditions are utilized, a parent-child relationship is not to be construed as constrained to stringently defined parent child relationships, but can also refer to any relationship where a "child" is a node that is referenced by another node (or "parent"). Thus, the parent can be defined as a referencing node (the referenced node being the child). Examples of such data structures that conform to these conditions can include extensible markup language (XML) schema definition (XSD) and Web Service Definition Language (WSDL) files. Further, these data structures can be graphically expressed as trees or data graphs.

Thus, a contiguous region of the data structure can represent a section of the data structure in which all the nodes defined in the contiguous region follow the parent-child relationship conditions described above. For example, a branch of a tree structure.

Also, as used herein, the term "one-to-many external reference" is used broadly herein to describe a one-to-many reference to nodes of the data structure from one structure to another. Thus, the one-to-many relationship can be between one structure and another in the same file, or from a structure in one file to an external data construct. For example, a second XSD file can reference multiple nodes expressed in a first XSD file (i.e., referencing a branch of a tree hierarchy).

Method 100 can begin in step 105 where such a memory management component can receive a one-to-many external reference to a contiguous region of a hierarchical data structure. In step 110, it can be determined if the data structure being referenced is currently available in volatile memory.

When the data structure is not currently available in volatile memory, the data structure can be loaded into volatile memory in step 115. When the data structure is available in volatile memory, step 120 can execute where the ancestor node of the referenced node can be determined.

A reference to the ancestor node can be created for the one-to-many reference in step 125. In step 130, a deep reference flag can be added to the reference. In one embodiment, the deep reference flag can be used to indicate that all child nodes of the ancestor node that have a flattenable flag parameter are to be returned when the relationship is evaluated.

As used herein, a deep reference can refer to links and relationships that have been embedded in an object in a manner not immediately accessible (e.g., will require additional processing to determine the relationships). Setting the deep reference flag or not indicates whether additional processing is to be expended to search beyond the "shallow" references recorded for nodes in a hierarchy. In one embodiment, different "levels" or depths of searching can be defined (instead of just using a binary flag) to provide more fine-grained control of searching The flattenable flag can be used together with deep references to determine if a node has visibility beyond shallow references. A child node referenced by a flattenable reference is considered to be referenced by a node that has a deep reference of a chain of flattenable references that include that child node.

It can be determined if the one-to-many reference includes all the nodes of the contiguous region in step 135. When all the nodes of the contiguous region are included in the one-to-many reference, flow of method 100 can proceed to step 155 where the reference can be stored in volatile memory.

When the one-to-many reference does not include all the nodes of the contiguous region, step 140 can be performed where a relationship path parameter is added to the reference. The relationship path parameter can represent a field of the reference used to contain pathing and/or termination conditions regarding the contiguous region.

For example, a one-to-many reference may only include one of multiple branches from a node in the contiguous region. To ensure that the other branches are not included, the relationship path field can contain information indicating the desired branch to be retrieved from the node.

Upon completion of step 140, it can be determined if the reference handles all the nodes expressed in the one-to-many reference in step 145. When all the nodes of the one-to-many reference are not handled by the reference, step 150 can execute where another reference can be generated with a relationship path to address the unhandled nodes.

Using the above example, the one-to-many reference may include two branches from the node having multiple branches. In such a case, two references would be needed to express all the nodes of the contiguous region included in the one-to-many reference.

From step 150, flow of method 100 can return to step 145 until all nodes of the one-to-many reference are addressed by references. Once all nodes are addressed, the one or more references can then be stored in volatile memory in step 155.

The following table can further illustrate the optimization of volatile memory storage requirements provided by method 100.

| | Conventional Implementations | Method 100 |
|---|---|---|
| Data structure storage | O(N) | O(N) |
| Relationship storage for external references $\{E_1, E_2, \ldots E_m\}$ | O(mn) | O(m) + O(m) |
| Total storage | O(N) + O(mn) | O(N) + O(m) |

As shown in the above table, both conventional implementations and method 100 can require memory space on the order of O(N) to store a data structure having N nodes. To store m external references to a contiguous region of n nodes, conventional implementations can require memory space on the order of O(mn), whereas method 100 can require only O(m)+O(m). This can result in method 100 requiring a total amount of memory space on the order of O(N)+O(m), while conventional implementations can require O(N)+O(mn).

Figure 2:
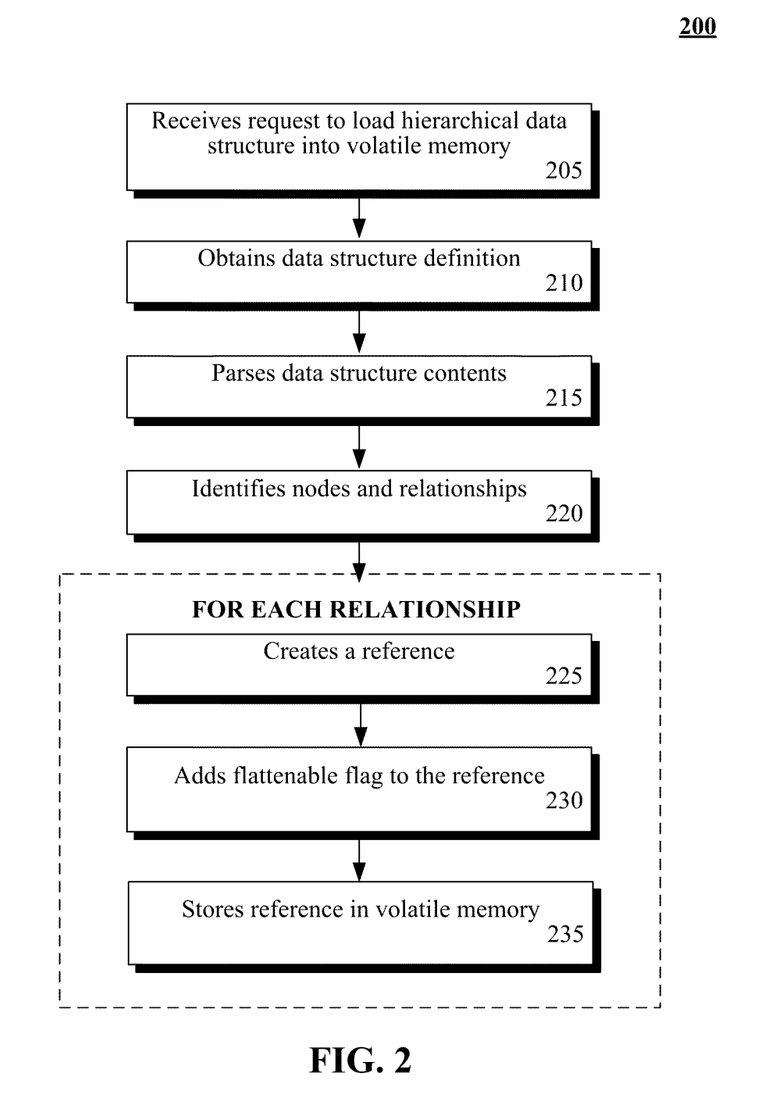
FIG. 2 is a flow chart of a method describing the storing of a hierarchical data structure within volatile memory for use with relationships in accordance with an embodiment of the inventive arrangements disclosed herein.

FIG. 2 is a flow chart of a method 200 describing the storing of a hierarchical data structure within volatile memory for use with relationships in accordance with embodiments of the inventive arrangements disclosed herein. The steps of method 200 can be performed by an appropriately configured memory management component of a computing system, as will be discussed in later Figures. Method 200 can be utilized by step 115 in method 100 of FIG. 1.

Method 200 can begin in step 205 where the memory management component can receive a request to load a hierarchical data structure into volatile memory. In step 210, a definition (e.g., file, document, record) for the data structure can be obtained.

The contents of the data structure can be parsed in step 215. In step 220, the nodes and relationships of the data structure can be identified. For each relationship contained in the data structure, a reference can be created in step 225.

In step 230, a flattenable flag can be added to the reference. The reference can then be stored in volatile memory in step 235.

Figure 3:
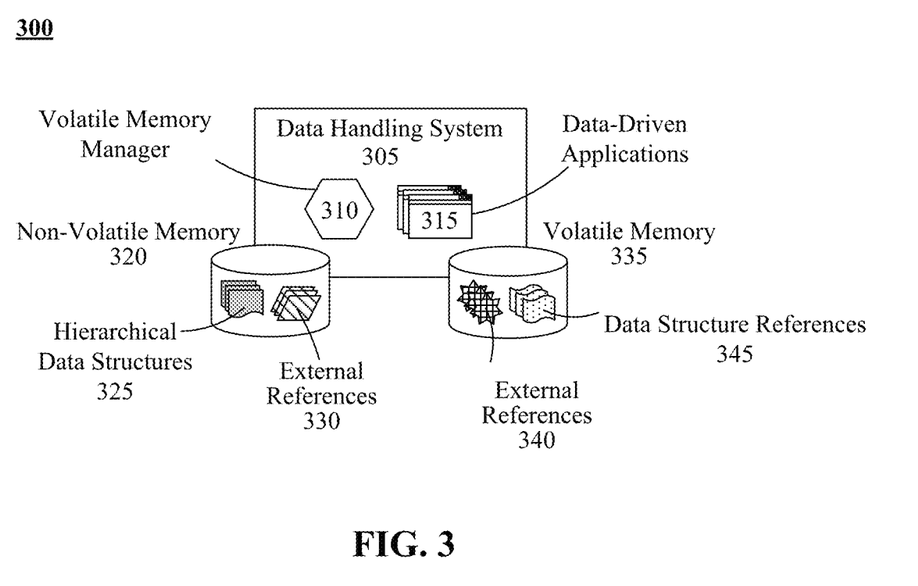
FIG. 3 is a schematic diagram illustrating a system for optimizing the storage of external references to hierarchical data structures in volatile memory in accordance with an embodiment of the inventive arrangements disclosed herein.

FIG. 3 is a schematic diagram illustrating a system 300 for optimizing the storage of external references 330 to hierarchical data structures 325 in volatile memory 335 in accordance with embodiments of the inventive arrangements disclosed herein. System 100 can be used to perform the steps of methods 100 and/or 200.

In system 300, the data handling system 305 can utilize a volatile memory manager 310 to optimize the storage of external references 330 to the data structures 325 within volatile memory 335. The data handling system 305 can represent the hardware and/or software components of a variety of computing systems configured to utilize hierarchical data structures 325 conforming to the conditions listed in the description of method 100 and external references 330 to the data structures 325 during the execution of data-driven applications 315.

For example, data handling system 305 can represent a business computing system which uses the WEBSPHERE™ MESSAGE BROKER. The MESSAGE BROKER TOOLKIT 315 can utilize embedded structure query language (ESQL) files 330 that reference constructs defined in XSD files 325.

Data handling system 305 can include non-volatile memory 320 and volatile memory 335. Non-volatile memory 320 can represent computer memory utilized for persistent storage, retaining stored data even when not powered (e.g., hard drives, optical discs, holographic memory). Non-volatile memory 320 can be used to store the data structures 325 and/or external references 330.

In another embodiment, the data structures 325 and/or external references 330 can be stored in the non-volatile memory 320 of an external computing system communicatively linked to the data handling system 305 via a network (not shown).

Volatile memory 335 can represent computer memory that requires power to maintain the stored information. Data-driven applications 315 typically utilize volatile memory 335 for data storage during execution due to its faster access speed.

As external references 330 are invoked during the execution of the data-driven applications 315, the data handling system 305 can use the volatile memory manager 310 to optimize the storage of references 340 and 345 representing the data structure 325 and external reference 330 within volatile memory 335, respectively. The volatile memory manager 310 can represent a software application configured to store external references 330 as external references 340 and data structures 325 as data structure references 345 within volatile memory 335.

To further performance of system 300, the volatile memory manager 310 can store the external references 340 and data structure references 345 in the same tabular format, as will be shown in later Figures.

Figure 4:
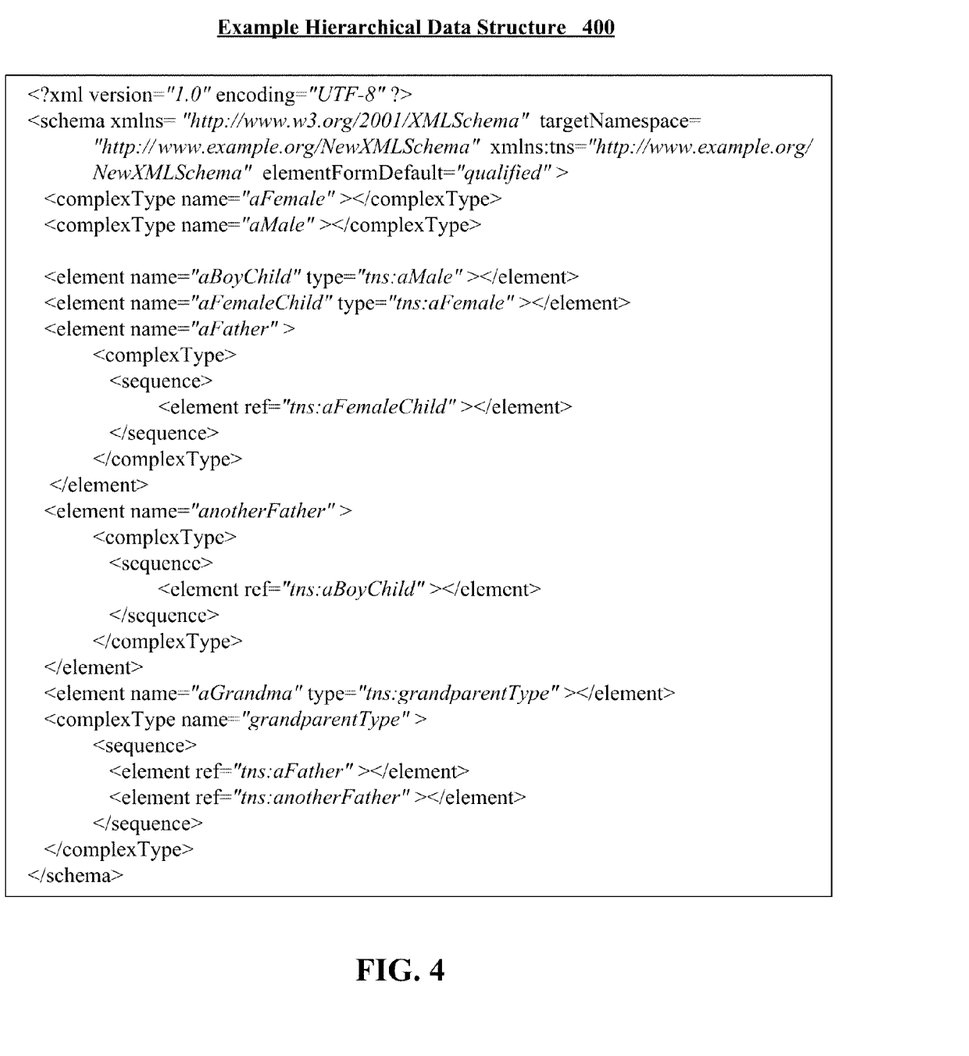
FIG. 4 is an example hierarchical data structure for use by a volatile memory manager in accordance with an embodiment of the inventive arrangements disclosed herein.

FIG. 4 is an example hierarchical data structure 400 for use by a volatile memory manager in accordance with embodiments of the inventive arrangements disclosed herein.

Example data structure 400 can be utilized within the context of system 300 and/or in conjunction with methods 100 and/or 200.

As shown in this example, data structure 400 can be an XSD document. The example data structure 400 can define various nodes or elements and the parent-child relationships between them. This example data structure 400 can represent a "family", where family relations are used as a metaphor for "parent-child" relationships existing between the related nodes of the hierarchical structure. Additional nodes (e.g., nodes for people who have "married" into the "family" and are therefore are also a parent of expressed child nodes) can be contained in external data constructs (i.e., other XSD files) that reference the example data structure 400.

Figure 4A:
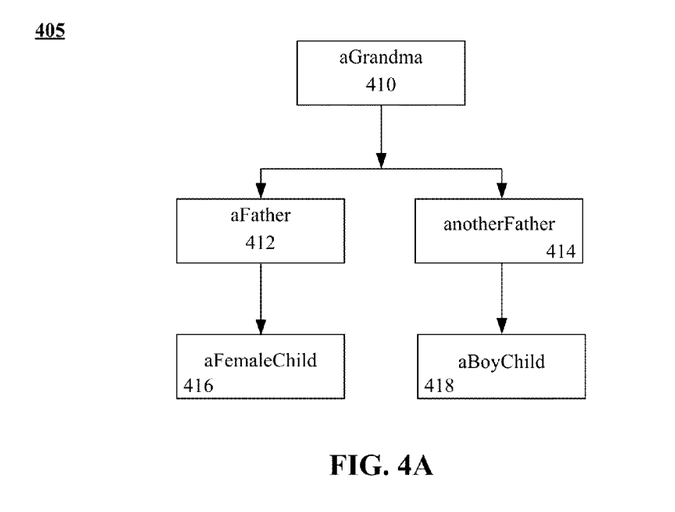
FIG. 4A illustrates a tree structure representation of the example hierarchical data structure.

The nodes and relationships contained within the example data structure 400 can be alternately expressed as the example tree structure 405. As depicted in example tree structure 405, aGrandma 410 can be the root node of the example data structure 400. aGrandma 410 can have two children elements, aFather 412 and anotherFather 414.

aFather 412 can be the parent of aFemaleChild 416. anotherFather 414 can be hierarchically related to aBoyChild 418.

Figure 4B:
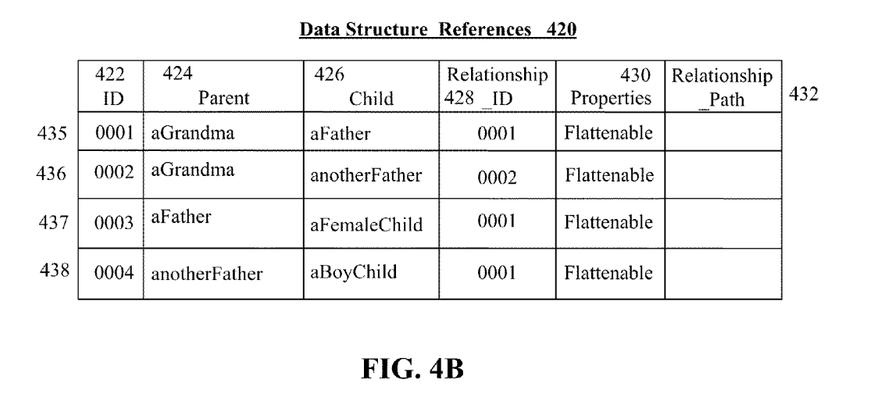
FIG. 4B illustrates the data structure references corresponding to the example hierarchical data structure.

The example data structure 400 can be loaded into volatile memory as the data structure references 420 of FIG. 4B. In this example, a data structure reference 435-438 can exist for each parent-child relationship of the example tree structure 405.

As shown, the data structure references 420 can be stored in a tabular format having data fields: ID 422, Parent 424, Child 426, Relationship_ID 428, Properties 430, and Relationship_Path 432. It should be noted that the data fields shown for the data structure references 420 are for illustrative purposes, and are not meant to represent a definitive implementation or limitation of an embodiment of the present disclosure.

The ID field 422 can contain a unique identifier for the data structure reference 420. Depending upon the implementation, the ID field 422 can represent a unique identifier of the database structure (e.g., primary key, foreign key) or can be a unique identifier for a specific data structure 400.

The Parent 424 and Child 426 fields can contain the identifiers of the parent and child nodes of the parent-child relationship being represented. The Relationship_ID field 428 can represent a unique identifier of the specific parent-child relationship of the example data structure 400. As shown in this example, the Relationship_ID field 428 can be used to delineate between the two parent-child relationships of aGrandma 410.

Figure 4C:
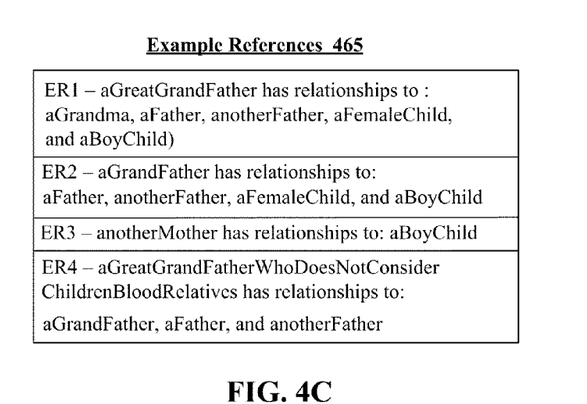
FIG. 4C illustrates references to the example hierarchical data structure.
Figure 4D:
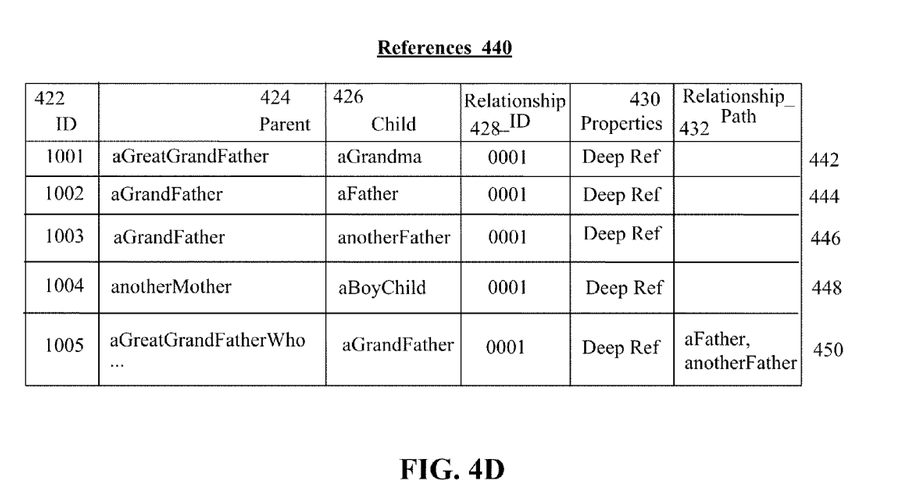
FIG. 4D illustrates the external references corresponding to the example external references.

The Properties field 430 can contain the flags that indicate whether the record in this table is a data structure reference 420 or an external reference 440, as shown in FIG. 4D. A data structure reference 420 can have a value of "Flattenable" for the Properties field 430.

For data structure references 420, the Relationship_Path field 432 can remain empty (i.e., have a value of NULL or N/A). As previously discussed, a Relationship_Path parameter can be specified for an external reference 450, not data structure references 420. The Relationship_Path field 432 can be shown in this table for the data structure references 420 to illustrate the common storage structure shared by the data structure references 420 and external references 440, and will be discussed in FIG. 4D.

As discussed in method 200 of FIG. 2, the data structure references 420 representing the example data structure 400 can be stored in volatile memory when a data-driven application executes an external reference to the example data structure 400. FIG. 4C can illustrate four example references 465 for the example data structure 400.

In other words, the references shown in FIG. 4C can be derived from one-to-many references, such as those of structure 400 and 405. These relationships can include "deep" references determined when flattened nodes of structure 405 were unflattened. Relationships expressed in references 465 can be recorded in the table of references 440 in accordance with an embodiment of the disclosure.

FIG. 4C shows the following relationships are defined by external references (references external to structure 420)
    aGreatGrandFather (father of aGrandma 410, grandfather to aFather 412 and anotherFather 414, great grandfather to aFemaleChild 416 and aBoyChild 418)
    aGrandFather (husband to aGrandma 410, father to aFather 412 and anotherFather 414, grandfather to aFemaleChild 416 and aBoyChild 418, son of aGreatGrandFather)
    anotherMother (wife of anotherFather 414 and mother of aBoyChild 418):
    aGreatGrandFatherWhoDoesNot-
    ConsiderChildrenBloodRelatives (father to aGrandFather, grandfather to aFather 412 and anotherFather 414—who does not acknowledge relationships to aFemaleChild 416 or to aBoyChild 418)

These additional relationships are expressed in external references ER1, ER2, ER3, and ER4, which are stored as records in memory as shown in references 440. Specifically, ER1 can be for aGreatGrandFather. ER2 can be for aGrandFather. ER3 can be for anotherMother. ER4 can be for aGreatGrandFatherWhoDoesNotConsider-ChildrenBloodRelatives. (i.e., only counts adults to be blood relatives).

The table of FIG. 4D can illustrate the external references 440 that correspond to the example references 465. Data fields 422-432 of the table can be identical to those used for the data structure references 420 of FIG. 4B. However, the values of the data fields 422-432 can reflect the example references 465.

Following a standard family tree structure, aGreatGrandFather can be hierarchically superior to the aGrandma 410 of the example data structure 400. Therefore, ER1 can be expressed as external reference 442 listing aGreatGrandFather as the Parent 424, aGrandma 410 as the Child 426, and having a "Deep Reference" value for the Properties field 430. Thus, the one-to-many ER1, which would require storage of five references using a conventional storage implementation because aGrandma is the common ancestor to all five references, can be expressed in a single external reference 442.

Since the aGrandFather expressed in ER2 is a sibling node of the aGrandma 410, ER2 can have relationships to the same children nodes as the aGrandma 410. As shown in the example tree structure 405 of FIG. 4A, aGrandma 410 can be the ancestor node of two branches. However, the exclusion of aGrandma 410 leaves the two branches without a common ancestor node. Therefore, ER2 can require two external references 444 and 446, one for each branch. Each external reference 444 and 446 can include a "Deep Reference" value for the Properties field 430 to indicate that child nodes having a "Flattenable" Properties 430 value should also be retrieved.

Although two external references 444 and 446 are required using this embodiment of the present disclosure, this can still represent a significant storage savings over a conventional implementation that would require four references to express.

Since ER3 (anotherMother) has a relationship to a single node, ER3 can require a single external reference 448. With such a small contiguous region of the example data structure 400 referenced, this embodiment of the present disclosure can require the same amount of storage as conventional implementations.

The definition of ER4 can exclude the child nodes of aFather 412 and the anotherFather 414. Thus, the contiguous region of the example data structure 400 referenced by ER4 can start with common ancestor node aGrandFather and can be required to terminate retrieval at aFather 412 and anotherFather 414.

As shown in the external reference 450 representing ER4, these termination conditions can be contained in the Relationship_Path field 432. It should be noted that expression of terminating and/or pathing condition within the Relationship_Path field 432 can vary based upon the specific implementation of this embodiment of the present disclosure.

The following example can further illustrate the usage of data structure references 420 and external references 440 by a data handling system. In this example, the data handling system can utilize a WEBSPHERE™ MESSAGE BROKER and have multiple XSD files representing example data structures 400 and ESQL files representing example references 465.

Let us assume that we want to rename aBoyChild 418 to aMaleChild. From the text of the example references 465 of FIG. 4C and the example data structures 400, it can be seen that aBoyChild 418 is related to anotherFather 414, aGrandma 410, aGreatGrandFather (ER1), aGrandFather (ER2), and anotherMother (ER3). The relationship of aGrandma 410 can be inferred from the hierarchy of structure 405, once it is known that anotherFather 414 is a parent of aBoyChild 418. These results can be produced as following (using the disclosed data-driven application (e.g., MESSAGE BROKER TOOLKIT), executing a search algorithm using the records of the data structure references 420 and reference 440.

So, we would first find the Parents 424 of data structure references 420 and reference 440 that have aBoyChild 418 as a Child 426. This returns a result set (RS) of anotherMother (ER3) from external reference 448 and anotherFather from data structure reference 438. External reference 448 is an example of a single level relationship.

To ensure that the original node is contained in the contiguous region represented by the external reference 448, the value of the Relationship_Path field 432 can be checked. Since external reference 448 has a blank Relationship_Path field 432, it can be assumed that aBoyChild is referenced by anotherMother (ER3). Thus, ER3 can remain in the results set.

Since data structure references 438 is a direct relation to aBoyChild, anotherFather can remain in the results set to represent the XSD file that will require modification (RS={ER3, anotherFather}). However, the "Flattenable" value of data structure reference 438 can indicate that the superior parent-child relationship of this Parent 424 (i.e., parent of anotherFather) should be included (i.e., other data structure references 420 exist having this Parent 424 as a Child 426). Therefore, we need to recursively search our data to find data structure references 420 and/or external references 440 to our flattenable Parent 424 (e.g., anotherFather).

This second search results in aGrandma from data structure reference 436 and aGrandFather (ER2) from external reference 446. Since external reference 446 has a "Deep Reference" Properties field 430 and a blank Relationship_Path field 432, aGrandFather (ER2) can be added to the result set (RS={ER3, ER2, anotherFather}).

Since data structure reference 436 has a "Flattenable" Properties field 430 value and is not a direct relation to aBoyChild, aGrandma cannot be added to the result set. Another search for aGrandma Parent field 424 values can be performed. This third search can result in ER1 and ER4 from external references 442 and 450, respectively.

Both external references 442 and 450 have a "Deep Reference" Properties field 430 value indicating that the parent elements have visibility to child elements in 'downstream' flattenable references. Since the Relationship_Path field 432 of external reference 442 is blank, aGreatGrandFather (ER1) can be added to the results set (RS={ER3, ER2, ER1, anotherFather}).

As shown in this example, the Relationship_Path field 432 of external reference 450 contains a value, and, therefore, must be assessed for inclusion of aBoyChild. Since the termination conditions expressed in the Relationship_Path field 432 of external reference 450 excludes aBoyChild because the search terminates at its parent element (anotherFather), ER4 can be excluded from the results set.

Now, without any "Flattenable" data structure references 420 to continue searching upon, we are left with our final results set containing ER3, ER2, ER1, and anotherFather, as expected.

It should be noted that, although the above example utilized a "Bottom-Up Seek" algorithm for searching through the data structure references 420 and example references 465, other search algorithms, such as a "Top-Down Seek", can be utilized.

It should also be noted that aBoyChild can represent a relative relationship within a nodal hierarchy of relationships (as can other referenced provided herein). These relative relationships can be mapped to absolute ones, which are used for processing, in one embodiment of the disclosure. Further, the system, method, and programs detailed herein can include an ability to refactor (rename) relative references, so that proper absolute nodes (or proper relationships) are utilized. Further, in one embodiment, relationship synonyms can be enabled, so that different relative terms for substantially equivalent relationships can be interchangeably used (e.g., aMaleChild can be equivalent to aBoyChild; aGrandMother can be equivalent to aGrandMa; etc.).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for optimizing the storage of a one-to-many reference to a hierarchical data structure comprising:

receiving of a one-to-many reference to a contiguous region of a hierarchical data structure by a memory management component of a data handling computing system, where said one-to-many reference originates from a data construct external to the hierarchical data structure, and, wherein said hierarchical structure comprises a plurality of uniquely-identifiable parent-child relationships between nodes;

loading each uniquely-identifiable parent-child relationship of the hierarchical data structure as a data structure reference into a volatile memory element of the data handling computing system, wherein said data structure reference conforms to a predefined reference format;

determining an ancestor node of the contiguous region within the hierarchical data structure referenced by the one-to-many reference, wherein said ancestor node is common to all other nodes of the contiguous region;

creating an external reference to represent the one-to-many reference, wherein said external reference is a parent-child relationship between a source of the one-to-many reference and the ancestor node of the hierarchical data structure, wherein the external reference conforms to the predefined reference format; and storing the external reference within the volatile memory element.

2. The method of claim 1, wherein prior to the loading of the hierarchical data structure further comprises:

determining an existence of data structure references representing the hierarchical data structure within the volatile memory element; and when the data structure references already exist within the volatile memory, bypassing execution of the loading of the hierarchical data structure.

3. The method of claim 1, wherein when an ancestor node common to all nodes is unable to be determined further comprises:

identifying at least two disparate branches of the contiguous region, wherein a union of the at least two disparate branches express all the nodes of the contiguous region;

for each disparate branch, determining the ancestor node of a disparate branch;

executing the creation of the external reference for the disparate branch; and recording in a relationship path field of the predefined reference format a value representing at least one of path information and a termination condition for the disparate branch, wherein said recorded value defines the nodes contained in the disparate branch.

4. The method of claim 1, wherein creating the external reference further comprises:

assigning a value of deep reference to a properties field of the predefined reference format, wherein said value indicates an inclusion of all data structure references related to the ancestor node having a value of flattenable in the properties field.

5. The method of claim 1, wherein the loading of the hierarchical data structure further comprises:

obtaining a source definition of the hierarchical data structure;

parsing said source definition to identify nodes and parent-child relationships;

for each parent-child relationship, creating the data structure reference;

adding a value of flattenable to a properties field of the predefined reference format for the data structure reference, wherein said value indicates that a parent node of the data structure reference is capable of being referenced by at least one of an external reference and another data structure reference; and storing the data structure reference within the volatile memory element.

6. The method of claim 1, wherein the predefined reference format comprises a plurality of data fields, said data fields comprising at least a parent node field, a child node field, a properties field, a relationship identification field, and a relationship path field.

7. The method of claim 1, wherein the hierarchical data structure is an extensible markup language (XML) schema definition (XSD) file.

8. The method of claim 1, wherein the hierarchical data structure is a Web service definition language (WSDL) file.

9. The method of claim 1, wherein the hierarchical data structure meets the following conditions:

each of the data structures are able to be described as a quantity of discrete components;

every one of the discrete components is related to another of the discrete components through a parent-child relationship;

each parent child relationship that relates the discrete components to each other is a 1:1 relationship, although a parent component is able to have a plurality of children;

each parent-child relationship is able to be uniquely identified; and there is one component of each of the data structures that is a parent or ancestor of all other components.

10. The method of claim 9, wherein if any of the conditions for the hierarchical data structure of claim 9 is not met, the method is not able to be utilized to optimize the external reference.

11. The method of claim 1, wherein the hierarchical data structure has N nodes, wherein the external reference that represents the one-to-many references consumes $O(N)+O(M)$ of the volatile memory element for M relationships.

12. A computer program product comprising a non-transitory computer readable storage medium having computer usable program code embodied therewith, the computer usable program code comprising:

computer usable program code stored in a non-transitory storage medium, when said computer usable program code is executed by a processor it is operable to receive of a one-to-many reference to a contiguous region of a hierarchical data structure by a memory management component of a data handling computing system, where said one-to-many reference originates from a data construct external to the hierarchical data structure, and, wherein said hierarchical structure comprises a plurality of uniquely-identifiable parent-child relationships between nodes;

computer usable program code stored in a non-transitory storage medium, when said computer usable program code is executed by a processor it is operable to load each uniquely-identifiable parent-child relationship of the hierarchical data structure as a data structure reference into a volatile memory element of the data handling computing system, wherein said data structure reference conforms to a predefined reference format;

computer usable program code stored in a non-transitory storage medium, when said computer usable program code is executed by a processor it is operable to determine an ancestor node of the contiguous region within the hierarchical data structure referenced by the one-to-many reference, wherein said ancestor node is common to all other nodes of the contiguous region;

computer usable program code stored in a non-transitory storage medium, when said computer usable program code is executed by a processor it is operable to create an external reference to represent the one-to-many reference, wherein said external reference is a parent-child relationship between a source of the one-to-many reference and the ancestor node of the hierarchical data structure, wherein the external reference conforms to the predefined reference format; and computer usable program code stored in a non-transitory storage medium, when said computer usable program code is executed by a processor it is operable to store the external reference within the volatile memory element.

\* \* \* \* \*